United States Patent
Fujisawa

(10) Patent No.: US 8,711,391 B2
(45) Date of Patent: Apr. 29, 2014

(54) IMAGE FORMING APPARATUS TO AUTOMATICALLY SELECT A COMMUNICATION CONDITION

(75) Inventor: Kuniaki Fujisawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1326 days.

(21) Appl. No.: 11/218,439

(22) Filed: Sep. 6, 2005

(65) Prior Publication Data

US 2006/0050306 A1    Mar. 9, 2006

(30) Foreign Application Priority Data

Sep. 7, 2004   (JP) ................................ 2004-259146

(51) Int. Cl.
*G06F 3/12*    (2006.01)

(52) U.S. Cl.
USPC ....................................... 358/1.15

(58) Field of Classification Search
None
See application file for complete search history.

(56) References Cited

U.S. PATENT DOCUMENTS

| | | | | |
|---|---|---|---|---|
| 5,550,957 A * | 8/1996 | Davidson et al. | ............ | 358/1.15 |
| 6,493,104 B1 * | 12/2002 | Cromer et al. | ............... | 358/1.15 |
| 6,801,328 B2 * | 10/2004 | Tsukamoto et al. | ......... | 358/1.13 |
| 6,961,136 B2 * | 11/2005 | Ogura et al. | ................. | 358/1.14 |
| 7,251,696 B1 * | 7/2007 | Horvitz | ......................... | 709/228 |
| 2003/0100335 A1 * | 5/2003 | Gassho et al. | ................ | 455/552 |
| 2004/0187022 A1 * | 9/2004 | Asada et al. | .................. | 713/200 |
| 2005/0157333 A1 * | 7/2005 | Cho et al. | ..................... | 358/1.15 |
| 2005/0195422 A1 * | 9/2005 | Baez et al. | .................... | 358/1.14 |

FOREIGN PATENT DOCUMENTS

JP    2003-348095    12/2003

* cited by examiner

*Primary Examiner* — Benny Q Tieu
*Assistant Examiner* — Sunil Chacko
(74) *Attorney, Agent, or Firm* — Rabin & Berdo, P.C.

(57) ABSTRACT

An image forming apparatus comprises a communicator for performing communications with a plurality of host apparatuses, a memory for memorizing a plurality of communication conditions, a selector for selecting a single communication condition among the plurality of communication conditions stored in the memory, wherein the communicator performs communications based on the single communication condition selected with the selector.

15 Claims, 5 Drawing Sheets

| COMMUNICATION CONDITION NUMBER | NETWORK IDENTIFIER | COMMUNICATION CHANNEL NUMBER | AUTHENTICATION METHOD | ENCRYPTION METHOD | COMMUNICATION PROTPCOL |
|---|---|---|---|---|---|
| 1 | common | - | - | - | LPR |
| 2 | common | 8 | EAP-TLS | AES | FTP, HTTP, SNMP, SMTP, |

| COMMUNICATION CONDITION NUMBER | START TIME |
|---|---|
| 1 | 00:00 |
| 2 | 23:00 |

| COMMUNICATION CONDITION | APPARATUS STATUS |
|---|---|
| COMMUNICATION CONDITION1 | ONLINE |
| COMMUNICATION CONDITION2 | PAPER JAM<br>OUT OF SUPPLIES |

IMAGE FORMING APPARATUS TO AUTOMATICALLY SELECT A COMMUNICATION CONDITION

BACKGROUND OF THE INVENTION

1. Field of the Invention

This invention relates to an image forming apparatus.

2. Description of Related Art

An image forming apparatus such as, e.g., a printer or the like having wireless communication capability is conventionally connected to wireless networks such as, e.g., a wireless LAN (Local Area Network) or the like to form images based on image information received from a host apparatus such as, e.g., a personal computer or the like. Specially, wireless LAN system referred to as a Hotspot (registered trademark in Japan) is widely spread in these years, with which the personal computers or the like used by many and unidentified users can be connected to the Internet through the wireless LAN. With such wireless LAN facilities, the image forming apparatus and the host apparatus which have the wireless communication capability can communicate via an access point connected to, e.g., the Internet or the like as well as can communicate with each other.

In consideration of use with such wireless LAN facilities, proposed in Japanese Patent Application Publication No. 2003-348,095, for example, is an image forming apparatus which participates in a plurality of channels in a power saving mode and boots up upon switching the channels at every activation period set for each channel. With this apparatus, the image forming apparatus implements control operation to prioritize the activated channel over the other channels where receiving data from other apparatus while communicating through the activated channel. Furthermore, the image forming apparatus also can implement control operation not to participate in the other channels while switching the mode of the activated channel to be in an active mode.

The conventional image forming apparatus such as described above, however, is not provided with adequate measure against risk in a case where used with low-security wireless LAN facilities such as open to the public, for example, the Hot spot (registered trademark in Japan) or the like. In a case of the image forming apparatus such as used with the low-security wireless LAN facilities, the high security is required for communication with an administrative server on, e.g., accounting records, operation records, or the like, because a mala fide third party can easily participate in the low-security networks. Because communicating through the plurality of channels using a single wireless communicator, the conventional image forming apparatus described above cannot select such the other end as set with the required security in a case of performing communication requiring the high security.

It is an object of this invention to solve the problem with the conventional image forming apparatus as described above and to provide an image forming apparatus, by switching exclusively the communication conditions, to establish the wireless communication even with a low-security access point during the regular communication and to establish the wireless commutation only with a high-security access point during the communication requiring high security, thereby preventing risks such as, e.g., wiretap on communication contents or impersonate attack by mala fide third parties.

SUMMARY OF THE INVENTION

To achieve the above objects, the image forming apparatus according to this invention a communicator for performing communications with a plurality of host apparatuses, a memory for memorizing a plurality of communication conditions, a selector for selecting a single communication condition among the plurality of communication conditions stored in the memory, wherein the communicator performs communications based on the single communication condition selected with the selector.

According to the invention, an image forming apparatus can switch communication conditions exclusively. Therefore, a wireless connection can be established even with a low-security access point in a case of regular communication while being established only with a high-security access point in a case of communication requiring high security, thereby being able to prevent dangers such as, e.g., wiretap on communication contents or impersonate attack by a mala fide third party.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

DETAILED DESCRIPTION OF PREFERRED EMBODIMENTS OF THE INVENTION

Hereinafter, embodiments of this invention will be described in detail in reference to drawings.

Figures 1, 2, 3:
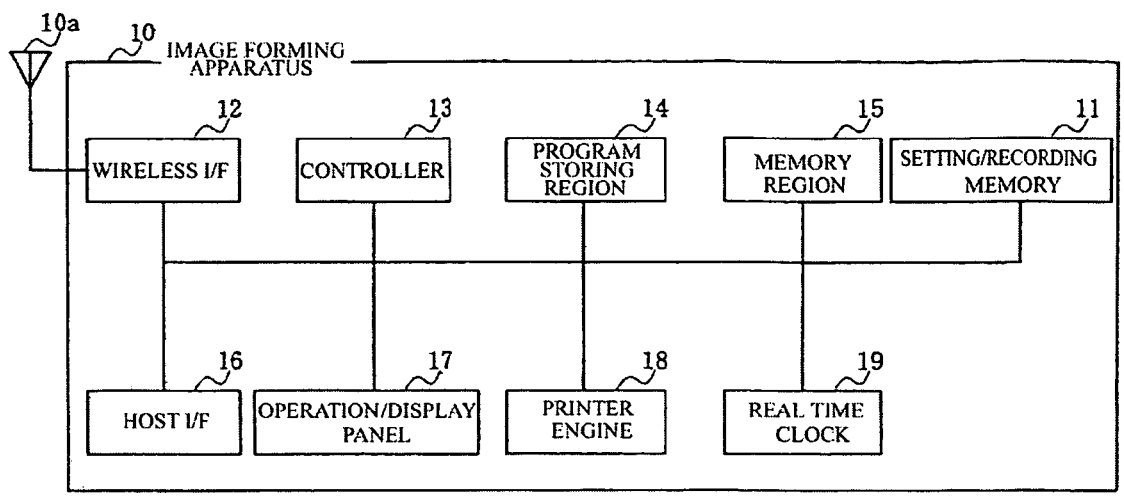
FIG. 1 is a block diagram showing a structure of an image forming apparatus according to the first embodiment of this invention.
FIG. 2 is a table showing an example of communication conditions according to the first embodiment of this invention.
FIG. 3 is a table showing an example of a coordination between the communication condition and start time according to the first embodiment of this invention.

FIG. 1 is a block diagram showing a structure of an image forming apparatus according to the first embodiment of this invention.

In FIG. 1, numeral 10 is an image forming apparatus having wireless communication capability. The image forming apparatus 10 is defined as, e.g., an ink jet printer, an electrophotographic printer, a copying apparatus, a facsimile apparatus, an image reading apparatus, a multi function product combined with functions of the printer, the facsimile apparatus, and the copying apparatus, or the like but may be any type of image forming apparatuses and may be such an apparatus as forming images in monochrome or in multicolor.

Described herein is a situation where the image forming apparatus 10 is the electrophotographic printer. Furthermore, the image forming apparatus 10 has a computing unit such as, e.g., a CPU (Central Processing Unit), an MPU (Micro Processing Unit), or the like, a memory unit such as, e.g., a semiconductor memory or the like, a display unit such as, e.g., an LCD (Liquid Crystal Display), an LED (Light Emitting Diode) display, or the like, an input unit such as, e.g., a key board, a push-button, a touch panel, or the like, and an input and output interface.

From the viewpoint of functionality, the image forming apparatus 10 has a setting and recording memory 11 serving as a memory, a wireless interface 12 serving as a communicator, a controller 13 serving as a selector, a program storing region 14, a memory region 15, a host interface 16, an operation and display panel 17, a printer engine 18, a real time clock 19 serving as a period judging section, as shown in FIG. 1.

In this case, the wireless interface 12 implements wireless control for performing communication in using a wireless system and is connected to an antenna 10a for transmitting and receiving radio waves. The controller 13 executes a control program stored in the program storing region 14 to control an entire image forming apparatus 10 in reference to various setting values memorized with the setting and recording memory 11. Herein, the setting and recording memory 11 memorizes various settings necessary for controlling the image forming apparatus by the controller 13. The setting and recording memory 11 also memorizes recorded information such as, e.g., printing records, accounting or charging records, or the like of the image forming apparatus 10. Furthermore, the setting and recording memory 11 memorizes a plurality of communication conditions respectively corresponding to a plurality of access points for wireless communication. The setting and recording memory 11 further memorizes each communication condition and each start time of using the communication condition with a coordination between the communication condition and the start time. It is to be noted the program storing region 14 memorizes a program to be executed by the controller 13.

The memory region 15 stores temporal information at the time that the controller 13 implements operation of each type such as, e.g., image forming operation or the like. The host interface 16 includes a USB (Universal Serial Bus) interface or an IEEE1284 interface and controls communication with a host computer, not shown, connected through those interfaces.

The operation and display panel 17 is operated by a user of the image forming apparatus 10 and provides the user with an interface for operating the image forming apparatus 10. It is to be noted that the operation and display panel 17 has the input unit such as, e.g., the push-button, the switch, the touch panel, or the like as well as the display unit such as, e.g., a liquid crystal panel, the LED lamp, or the like.

The printer engine 18 has mechanisms for a paper feed, printing, etc. and controls these mechanisms to implement printing operation based on image information processed by the controller 13. Thus, the image forming apparatus 10 can form the images based on the image information input through the wireless interface 12. The real time clock 19 has a clocking function and provides information on the current time upon reception of a request by the controller 13. The real time clock 19 furthermore notifies the controller 13 about the current time at a specified time.

Operation of the image forming apparatus 10 thus structured is described next.

Figure 4:
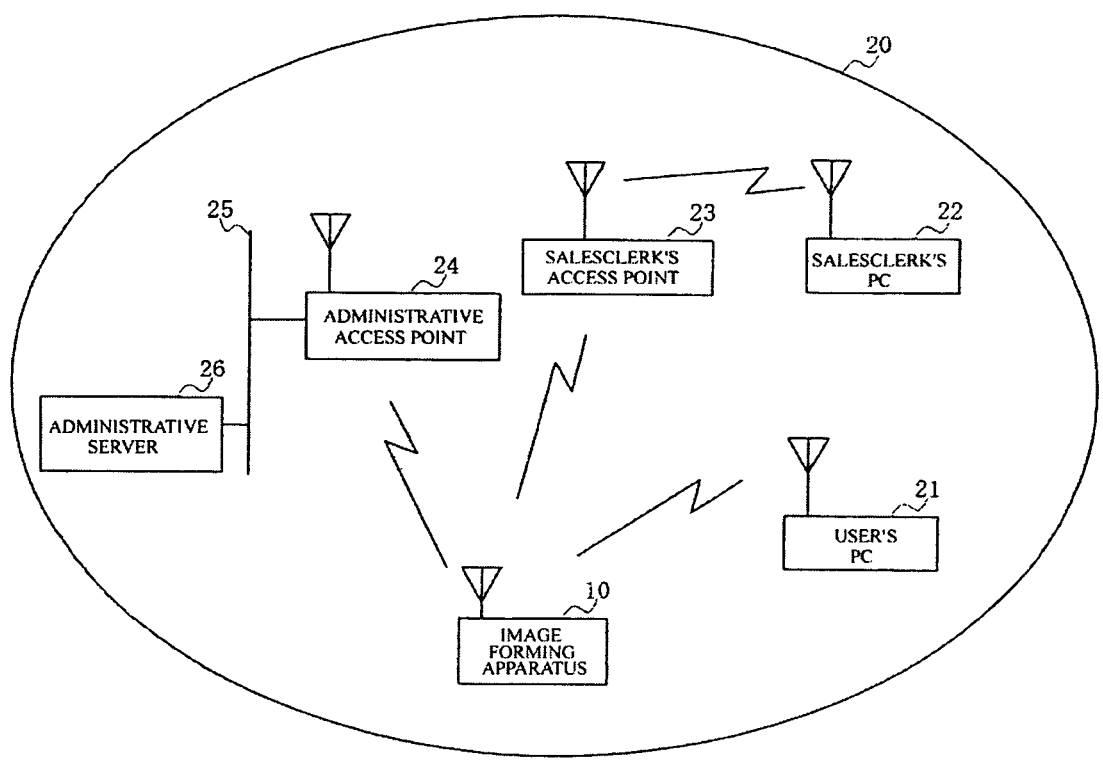
FIG. 4 is a view showing an example of installation environment for the image forming apparatus according the first embodiment of this invention.
Figure 5:
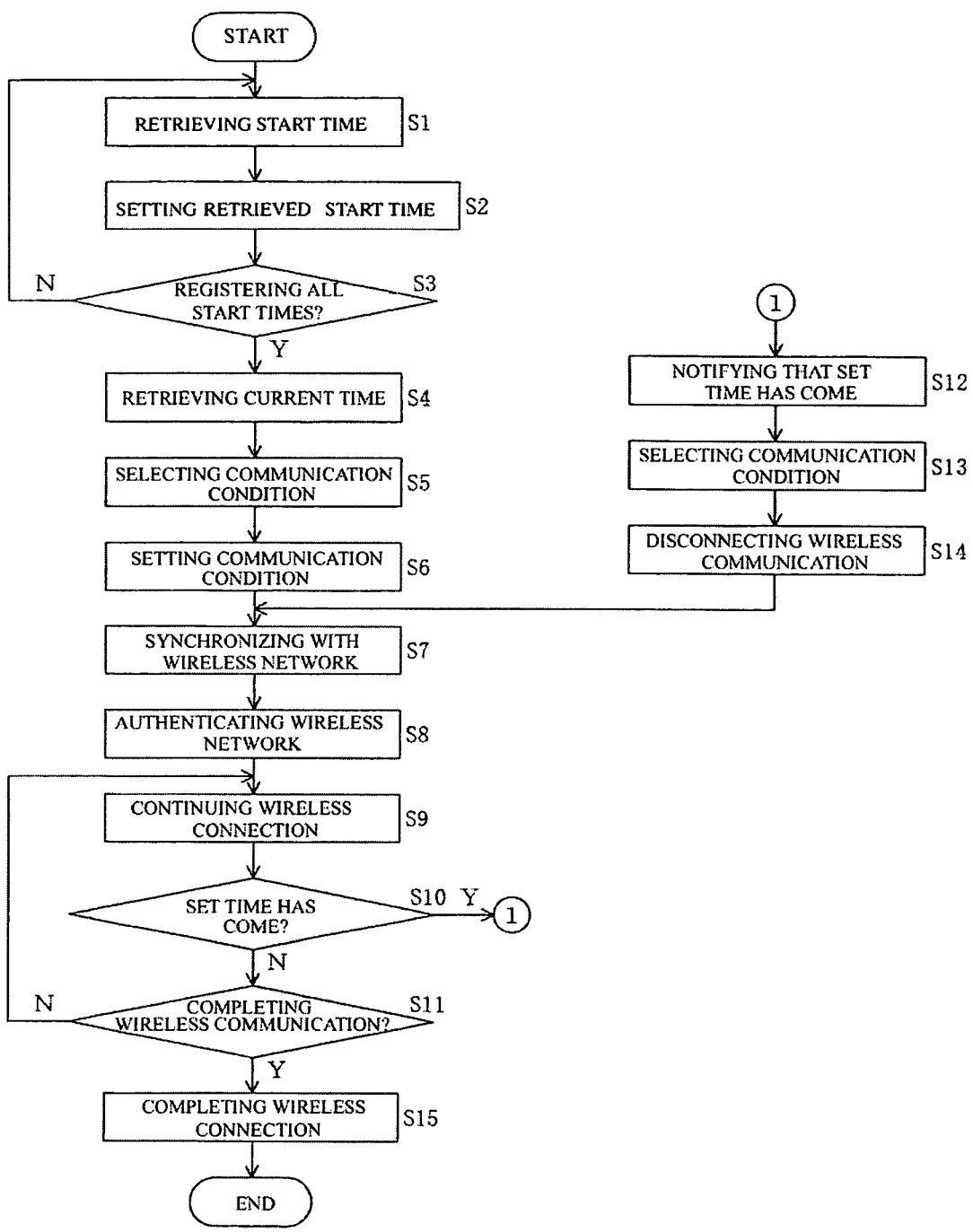
FIG. 5 is a flow chart showing operation of the image forming apparatus according to the first embodiment of this invention.

FIG. 2 is a table showing an example of communication conditions according to the first embodiment of this invention. FIG. 3 is a table showing an example of a coordination between the communication condition and start time according to the first embodiment of this invention. FIG. 4 is a view showing an example of an installation environment for the image forming apparatus according the first embodiment of this invention. FIG. 5 is a flow chart showing operation of the image forming apparatus according to the first embodiment of this invention.

As shown in FIG. 2, the image forming apparatus 10 according to this invention is set with two communication conditions respectively set with a network identifier, a communication channel number, an authentication method as an authentication condition, an encryption method as an encoding condition, and a condition on communication protocol. Herein, in a case of using a wireless communication system based on an IEEE802.11, an ESSID (Extended Service Set Identifier) is used as the network identifier.

Parameters such as, e.g., a user ID, a password, a certificate, a WEP (Wired Equivalent Privacy) key, or the like, necessary for the authentication method, the encryption method, etc., are stored as one part of various settings in a region of the setting and recording memory 11 separately from the communication condition.

In the case example in FIG. 3, application of a communication condition #1 is started at 00:00 and application of a communication condition #2 is started at 23:00.

As shown in FIG. 4, the image forming apparatus 10 according to this invention is to be installed for use inside a wireless communication area 20 on the wireless LAN system referred to as the Hotspot (registered trademark in Japan). Installed in the wireless communication area 20 are furthermore a user's PC 21 defined as a computer such as a personal computer or the like used by a general user, a salesclerk's PC 22 defined as a computer such as a personal computer or the like used by a salesclerk working for the wireless LAN system, a salesclerk's access point 23 defined as an access point for the salesclerk's PC 22, an administrative access point 24 defined as an access point used for administrating the wireless LAN system, an administrative network 25 defined as a network connected to the administrative access point 24, and an administrative server 26 defined as a computer connected to the administrative network 25, used for administrating the wireless LAN system.

In the user's PC 21, the network identifier of "common", the communication channel number of "11", and the authentication method as well as the encryption method of "–(N/A)" are to be set.

In the salesclerk's access point 23, the network identifier of "common", the communication channel number of "8", the authentication method of "SharedKey", and the encryption method of "WEP" are to be set. It is to be noted that the salesclerk's PC 22 is set to be wirelessly connectable to the salesclerk's access point 23.

In the administrative access point 24, furthermore, the network identifier of "common", the communication channel number of "8", the authentication method of "EAP-TLS", the encryption method of "AES" are to be set. Herein, the administrative access point 24 is connected to the administrative network 25 and has a relaying function between the wireless communication and the administrative network 25. It is to be noted that the administrative network 25 is defined as a private wired network. The administrative server 26 is connected to the administrative network 25 and manages the operation records or the accounting records of the image forming apparatus 10.

Described herein is operation of the image forming apparatus 10 set in a manner as shown in FIG. 2 and FIG. 3, installed inside the wireless communication area 20 as shown in FIG. 4, and powered on at 09:00.

Where the image forming apparatus 10 is powered on, the controller 13 seeks the setting and recording memory 11 for the communication conditions in sequence and retrieves the start times corresponding to the communication conditions respectively. The retrieved start time is subsequently set in the real time clock 19 so as to notify the controller 13 at the start time. In the case example as shown in FIG. 3, two start times, i.e., 23:00 and 00:00, are set in the real time clock 19.

The judgment is made as to whether all of the start times are registered. In this case, the above described operation is repeated until when all of the start times corresponding to the communication conditions respectively are registered in the real time clock 19, and a start processing for the wireless communication is implemented in a case where setting of all the start times is completed.

The controller 13 subsequently retrieves the current time from the real time clock 19.

The controller 13 then seeks for the start time corresponding to each of the communication conditions in the setting and recording memory 11, thereby selecting the communication condition to be used. It is to be noted that the selected communication condition is hereinafter referred to as an applied communication condition. In the case example as shown in FIG. 3, the communication condition #1 is selected in a case where the power is turned on at 09:00.

The controller 13 starts wireless connection upon controlling the wireless interface 12.

In this case, the controller 13 sets the communication condition, thereby setting in the wireless interface 12 the network identifier and the communication channel number in the applied communication condition. The wireless interface 12 synchronizes with the wireless network in using the set network identifier and communication channel number. Herein, where the wireless interface 12 cannot synchronize with the access point even after a certain period passes, the judgment is directly made as to whether the set start time has come.

Where a synchronization is established between the wireless interface 12 and the access point, authentication is conducted therebetween. In this case, the controller 13 gives to the access point in using the wireless interface 12 an authentication request in accordance with the authentication method and the encryption method in the applied communication condition.

The controller 13 continues the wireless connection until when notified that any of the set start times has come up already from the real time clock 19 in a case of completing the authentication between the wireless interface 12 and the wireless network. It happens in some cases that the authentication process results in failure, but it is to be noted that the controller 13 continues the wireless connection even though the controller 13 cannot conduct the wireless communication in a case of failing the authentication process.

In the case example shown in FIG. 2, the wireless interface 12 synchronizes with the wireless point having the network identifier of "common" since the applied communication condition is herein set to the communication condition #1. Any of the user's PC 21, the salesclerk's access point 23, and the administrative access point 24 can synchronize with the wireless network as shown in FIG. 4 since the condition on the communication channel number or the authentication method is not set.

The controller 13 can conduct the wireless communication through the wireless interface 12 in using the communication protocol set as the applied communication condition where succeeding in the authentication process to enable the wireless communication to be conducted.

The communication can be performed using an LPR protocol in the case example shown in FIG. 2. That is, the image information can be received in using the LPR protocol from the user's PC 21, the salesclerk's PC 22 via the salesclerk's access point 23, and the administrative server 26 via the administrative access point 24. Furthermore, any of the user's PC 21, the salesclerk's PC 22, and the administrative server 26 cannot communicate using protocols other than the LPR protocol since those protocols are not accordance with the applied communication condition.

It is to be noted that a re-authentication process is periodically implemented during the wireless connection depending on the authentication method in the applied communication condition. The re-authentication process is deemed as one part of operation for continuing the wireless connection in this embodiment.

The real time clock 19 measures time to make the judgment as to whether the set start time has come or not. If the set start time has not come yet, the judgment is made as to whether the wireless communication is to be completed. Where completing the wireless communication, the controller 13 instructs the wireless interface 12 to terminate the wireless connection and completes this process after termination of the wireless connection. The controller 13 continues the wireless connection where the apparatus does not complete the wireless communication.

The real time clock 19 notifies the controller 13 that the set time has come where any of the set start times has come. In the case example shown in FIG. 3, the real time clock 19 notifies the controller 13 at 23:00.

The controller 13 searches the setting and recording memory 11 for the communication conditions, thereby selecting the communication condition corresponding to the notified clock time. Subsequently, the newly selected communication condition is deemed as the applied communication condition. The communication condition #2 is set to the applied communication condition in the case example shown in FIG. 2.

The controller 13 subsequently disconnects the wireless communication by using the wireless interface 12. After completing disconnection of the wireless communication, the wireless interface 12 synchronizes with the wireless network using both of the set network identifier and communication channel number, thereby starting the wireless connection in accordance with the communication condition newly set to the applied communication condition.

Thus, the wireless communication only with the administrative access point 24 can be conducted as shown in FIG. 4. Accordingly, the communication to refer the accounting records using an FTP (File Transfer Protocol) or the communication to refer the apparatus status using an HTTP (Hyper Text Transfer Protocol) can be performed.

The user's PC 21 or the salesclerk's access point 23 cannot communicate since some of the communication channel number, the authentication number, and the encryption method are not matching to the applied communication condition, even where the conformable network identifier is matched.

Furthermore, the communication on the image information even via the administrative access point 24 cannot be performed in using the LPR protocol since the LPR is unconformable to the applied communication condition.

The communication condition #1 is subsequently applied again at 00:00.

A flow chart will be explained next. The controller 13 retrieves the start time at the step S1. The controller 13 sets the retrieved start time at the step S2. The judgment is made at the step S3 as to whether all of the start times are registered. If all the start times are registered, the operation goes to the step S4 and this operation is repeated until all the start time are registered. The controller 13 retrieves the current time at the step S4. The controller 13 selects the communication condition corresponding to the set time including the current time at the step S5. The controller 13 sets the selected communication condition at the step S6. The controller 13 establishes the synchronization with the access point and establishes the wireless connection in accordance with the selected communication condition at the step S7. The controller 13 conducts the authentication with the access point the step S8. The controller 13 continues the wireless connection at the step S9. The judgment is made at the step S10 as to whether the set clock time has come. If the set clock time has not yet come, the operation goes to the step S11, while if the set clock time has come, the operation goes to the step S12. The judgment is made at the step S11 as to whether the wireless communication is made over. If the wireless communication is made over, the operation goes to the step S15, while if the wireless communication is not made over yet, the operation returns to the step S9. The controller 13 is notified that the set time has come at the step S12. The controller 13 selects the communication condition corresponding to the current time at the step S13. The wireless communication is disconnected at the step S14. The controller 13 terminates the wireless connection and completes this process at the step S15.

As described above, the image forming apparatus 10 is structured in a manner to exclusively switch the communication conditions applied for the wireless communication depending on the clock time. Therefore, the image forming apparatus 10 can establish the wireless connection even with a low-security access point at the time of regular operation whereas establishing the wireless connection only with a high-security access point at the time of communication requiring the high security, such as for reference of the accounting records. Consequently, such effects can be obtained as preventing dangers such as, e.g., wiretap on communication contents or impersonate attack by a mala fide third party while the communication requiring the high security is conducted via the access point set with the low security only.

The second embodiment of this invention will be described next. It is to be noted that substantially the same portions as those in the first embodiment are assigned with the same reference numbers as in the first embodiment, and for the sake of simplicity, those duplicated descriptions are omitted. Furthermore, descriptions for substantially the same operation and effects as those in the first embodiment are also emitted.

Figures 6, 7:
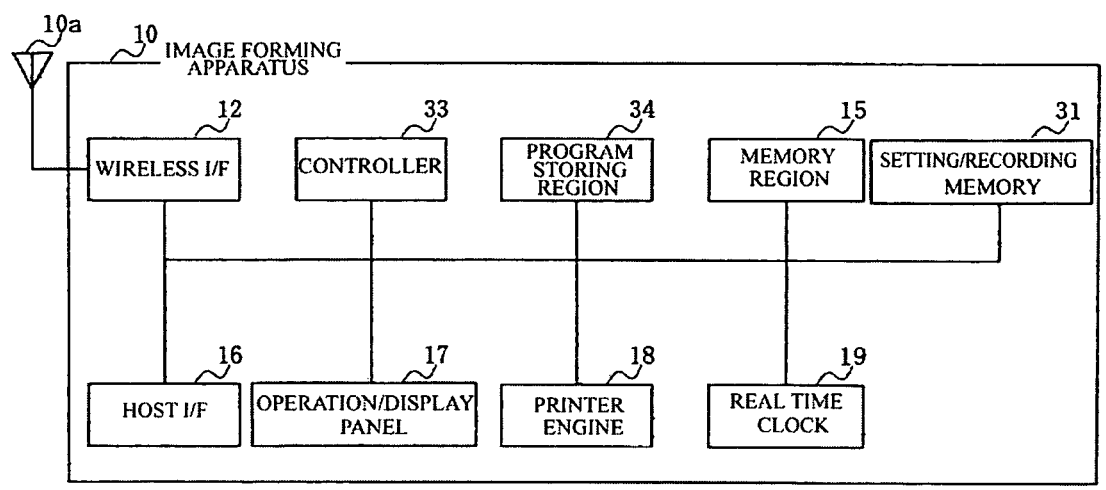
FIG. 6 is a block diagram showing a structure of an image forming apparatus according to the second embodiment of this invention.
FIG. 7 is a table showing an example of a coordination between a communication condition and apparatus status according to the second embodiment of the this invention.

FIG. 6 is a block diagram showing a structure of the image forming apparatus according to the first embodiment of this invention.

As shown in FIG. 6, the image forming apparatus 10 has a setting and recording memory 31, a controller 33, and a program storing region 34. The controller 33 executes, likewise the controller 13 in the first embodiment, the control program stored in the program storing region 34 while having a capability for controlling the entire image forming apparatus 10 in reference to various setting values stored in the setting and recording memory 31 as well as capability as an apparatus status detector for detecting an apparatus status of the image forming apparatus 10.

The setting and recording memory 31 serving as a memory memorizes various settings required for controlling the image forming apparatus 10 by the controller 33. The setting and recording memory 31 also memorizes recorded information such as, e.g., the operation records or the accounting records of the image forming apparatus 10. Furthermore, the setting and recording memory 31 memorizes the plurality of communication conditions respectively corresponding to the plurality of access points on the wireless communication. The setting and recording memory 31 further memorizes each communication condition and each detected apparatus status in an interrelated manner. The program storing region 34 stores a control program for operation implementation according to this embodiment.

It is to be noted that the antenna 10a, all of the wireless interface 12, the memory region 15, the host interface 16, the operation and display panel 17, the printer engine 18, and the real time clock 19 have substantially the same function as those in the first embodiment.

Described next is operation of the image forming apparatus 10 according to this embodiment.

Figure 8:
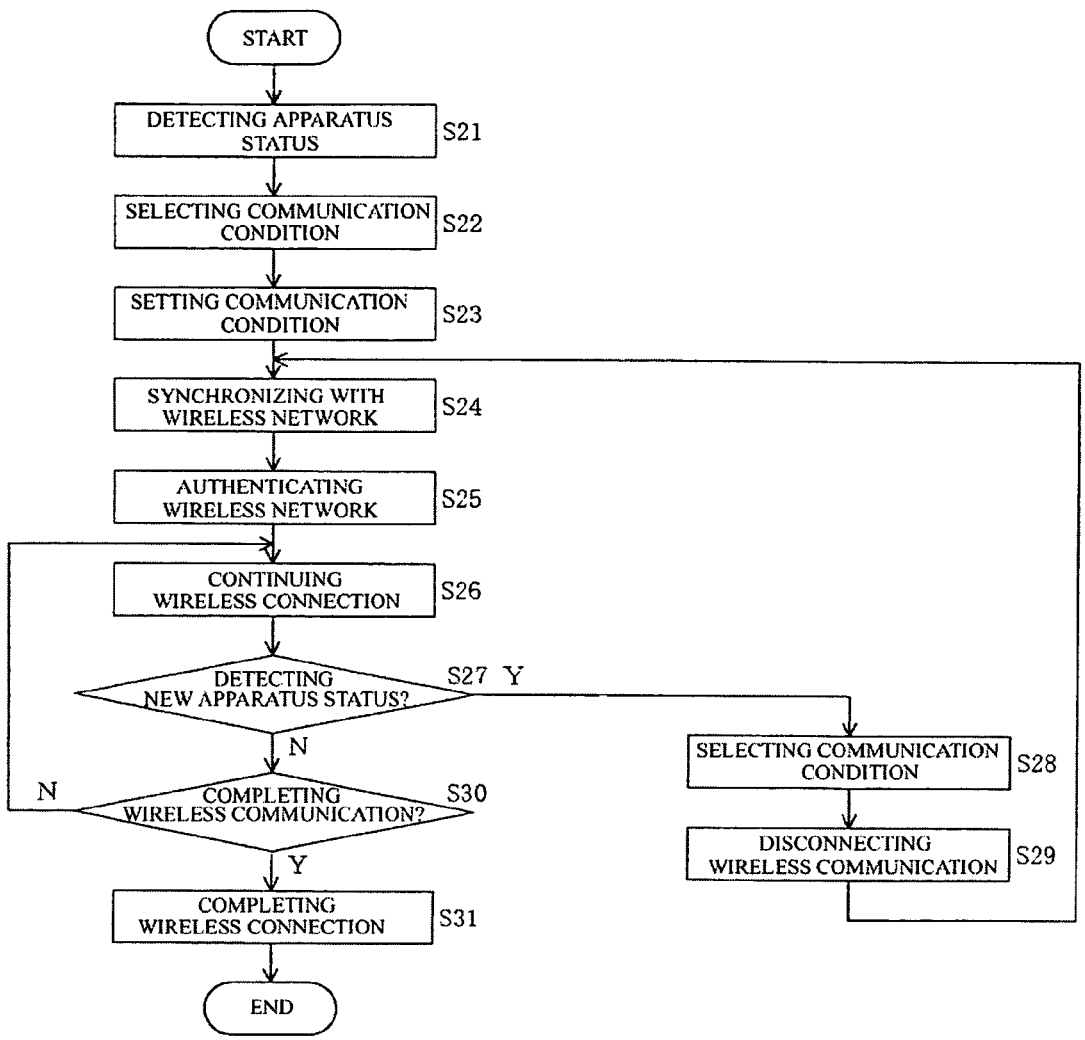
FIG. 8 is a flow chart showing operation of the image forming apparatus according to the second embodiment of this invention.

FIG. 7 is a table showing an example of a coordination between the communication condition and the apparatus status according to the second embodiment of this invention. FIG. 8 is a flow chart showing operation of the image forming apparatus according to the second embodiment of this invention. It is to be noted that the communication conditions stored in the setting and recording memory 31 is substantially the same as those according to the first embodiment, thereby being described in reference to FIG. 2.

Described herein is operation of the image forming apparatus 10 set as indicated in FIG. 2 and FIG. 7, installed in an environmental condition as shown in FIG. 4.

Where the image forming apparatus 10 is powered on, the controller 33 detects an apparatus status of the entire image forming apparatus 10. The controller 33 then searches the setting and recording memory 31 to select the communication condition corresponding to the detected apparatus status. The selected communication condition is subsequently set to the applied communication condition. Herein, in the case example as shown in FIG. 7, the communication condition 1 is set to the applied communication condition where the apparatus is detected in an "online" status.

The controller 33 starts the wireless connection next upon controlling the wireless interface 12. It is to be noted that explanation for operation from start of the wireless connection to completion of the authentication process is substantially the same as that in the first embodiment, so the duplicated explanation is omitted.

The wireless connection is thereafter continued until when other apparatus status is newly detected. In this operation, the re-authentication process is arbitrarily implemented as described above.

In the case example shown in FIG. 2, the communication using the LPR can be performed since the communication condition #1 is set to the applied communication condition. That is, the image information can be received in using the LPR protocol from the user's PC 21, the salesclerk's PC 22 via the salesclerk's access point 23, and the administrative server 26 via the administrative access point 24. Any of these terminals cannot communicate using protocols other than the LPR protocol since those protocols are not accordance with the applied communication condition.

The controller 33 then makes the judgment as to whether other apparatus status is newly detected. If the judgment is made that other apparatus status is newly detected, the controller 33 searches the setting and recording memory 31 and selects the communication condition corresponding to the detected apparatus status. The selected communication condition is subsequently set to the applied communication condition. Herein, if a "paper jamming" status is newly detected, the communication condition #2 is selected as the applied communication condition.

The controller 33 subsequently disconnects the wireless communication by using the wireless interface 12. After completing disconnection of the wireless communication, the wireless interface 12 synchronizes with the access point using both of the set network identifier and communication channel number, thereby starting the wireless connection in accordance with the communication condition newly set to the applied communication condition.

Thus, the wireless communication with the administrative access point 24 can be conducted as shown in FIG. 4. Accordingly, the communication for, e.g., notification of the apparatus status in using an SMTP (Simple Mail Transfer Protocol) becomes performable.

The user's PC 21 or the salesclerk's access point 23 cannot communicate since has the communication channel number, the authentication number, or the encryption method unconformable to the applied communication condition, even where having the conformable network identifier.

Furthermore, the communication on the image information via the administrative access point 24 cannot be performed in using the LPR protocol since the LPR is not accordance with the applied communication condition.

The communication condition 1 is set to the applied communication condition again where the apparatus substantially becomes in an "online" status again because of, e.g., maintenance or the like.

Furthermore, where making the judgment as to whether other apparatus status is newly detected and makes the judgment that the other apparatus status is not detected newly, the controller 33 makes the judgment as to whether the wireless is to be completed. Where completing the wireless communication, the controller 33 instructs the wireless interface 12 to terminate the wireless connection and makes this process over after termination of the wireless connection. Furthermore, the controller 33 continues the wireless connection where not completing the wireless communication.

A flow chart is explained next. The controller 33 detects the apparatus status at the step S21 and selects the communication condition based on the detected apparatus status at the step S22. The controller 33 sets the selected communication condition at the step S23. The synchronization with the access point is established at the step S24 and the authentication with the access point is conducted at the step S25. The controller 33 continues the wireless connection at the step S26. The judgment is made at the step S27 as to whether other apparatus status is newly detected. If other apparatus status is newly detected, the operation goes to the step S28, while if other apparatus status is not newly detected, the operation goes to the step S30. The controller 33 selects the communication condition based on the detected apparatus status at the step S28 and disconnects the wireless connection at the step S29. The judgment is made at the step S30 as to whether the wireless communication is completed. If the wireless communication is completed, the operation goes to the step S31, while if the wireless communication is not completed, the operation returns to the step S26. The controller 33 completes the wireless connection and makes this process over at the step S31.

As described above, the image forming apparatus 10 can exclusively switch the communication conditions applied for the wireless communication depending on the apparatus status. Therefore, the wireless connection can be established even with the low-security access point at the time of regular operation whereas established only with the high-security access point in the event of the apparatus status requiring the communication with the administrative server 26 or the like. Consequently, such effects can be obtained likewise the first embodiment, as preventing dangers such as, e.g., wiretap on communication contents or impersonate attack by a mala fide third party while the communication requiring the high security is conducted via the access point set with the low security only. Furthermore, the communication condition can be switched at the time that the wireless connection requiring the high security becomes necessary.

It is to be noted that a case example where two communication conditions are set is described in this embodiment, but this invention is also applicable to a case where two or more communication conditions are set.

Furthermore, this invention is not limited to the above described embodiments but can be variously modified based on the purpose of this invention, and those modifications are not excluded from the scope of this invention.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus comprising:
   a real time clock for ascertaining the current time of day;
   a memory for storing a plurality of communication conditions including different security conditions corresponding respectively to different times, the stored communication conditions including a first communication condition corresponding to a first time period and a second communication condition corresponding to a second time period;
   a selector for selecting a single communication condition, based on the current time of day, from among the plurality of communication conditions stored in the memory, the first communication condition being selected if the current time of day is in the first time period and the second communication condition being selected if the current time of day is in the second time period; and
   a communicator for performing wireless communications with at least one host apparatus based on the single communication condition selected with the selector,
   wherein the first communication condition is selected in the first time period and wireless communication is performed based on the selected first communication condition, and subsequently when the second time period comes, the wireless communication based on the first communication condition is discontinued, and after completing discontinuation of the wireless communication, wireless communication based on the second communication condition is performed.

2. The image forming apparatus according to claim 1, wherein the communication conditions further include one or more of a network identifier, a communication protocol, a communication channel number, and an authentication method.

3. The image forming apparatus according to claim 1, wherein the communicator capable of conducting the wireless communication uses a wireless communication system based on IEEE standard 802.11.

4. The image forming apparatus according to claim 3, wherein the communication conditions further include at least a network identifier, which uses an ESSID (Extended Service Set Identifier).

5. The image forming apparatus according to claim 1, wherein the at least one host apparatus includes an access point.

6. The image forming apparatus according to claim 1, wherein the plurality of communication conditions are different from one another.

7. The image forming apparatus according to claim 1, wherein the security conditions include at least a low-security communication condition and a high-security communication condition.

8. The image forming apparatus according to claim 1, wherein the plurality of communication conditions further include at least a printing data transmittance communication condition and an apparatus information access communication condition.

9. The image forming apparatus according to claim 1, wherein the plurality of communication conditions further include a communication condition for a printing data transmittable time and a communication condition for an error occurrence time.

10. The image forming apparatus according to claim 9, wherein the communicator transmits apparatus error information to a predetermined host apparatus when an error is detected at the image forming apparatus and the selector selects the communication condition for the error occurrence time.

11. The image forming apparatus, according to claim 1, the image forming apparatus having a plurality of apparatus statuses, and further comprising:

a controller for detecting the current status of the image forming apparatus based on information generated by the image forming apparatus, the current apparatus status being either an inoperable status or an operational status, wherein the memory further stores a plurality of communication conditions including different security conditions corresponding to the plurality of apparatus statuses of the image forming apparatus, the different security conditions being stored according to the current apparatus status detected by the controller and a prescribed communication condition being selected from among the plurality of communication conditions based on the current apparatus status detected by the controller;

wherein the selector further selects a communication condition from among the plurality of communication conditions based on the current apparatus status detected by the controller; and wherein the communicator further performs communications with at least one host apparatus based on the selected communication condition.

12. The image forming apparatus according to claim 11, wherein the apparatus statuses further include an on-line status and at least one malfunction status.

13. The image forming apparatus according to claim 11, wherein the apparatus statuses further include an on-line status, a paper-jam status, and an out-of-supplies status.

14. The image forming apparatus according to claim 11, wherein the communication conditions stored in the memory include the first communication condition in which the image forming apparatus is capable of communicating with a first external terminal apparatus and the second communication condition in which the image forming apparatus is capable of communicating with a second external terminal apparatus.

15. The image forming apparatus according to claim 11, wherein one of the communication conditions stored in the memory is selected based on the apparatus status of the image forming apparatus.

* * * * *